United States Patent [19]
Schissler

[11] 3,858,064
[45] Dec. 31, 1974

[54] STABLE ACOUSTIC DELAY SURFACE WAVE MOTION TRANSDUCER SYSTEMS

[75] Inventor: Lloyd R. Schissler, Jamaican Plain, Mass.

[73] Assignee: Sperry Rand Corporation, New York, N.Y.

[22] Filed: Aug. 30, 1973

[21] Appl. No.: 393,111

[52] U.S. Cl.................. 310/8.1, 310/8.4, 310/9.8, 333/30 R, 333/72
[51] Int. Cl............................................. H01v 7/00
[58] Field of Search.......... 310/8, 8.1, 9.7, 9.8, 8.4; 333/30 R, 72; 330/5.5

[56] References Cited
UNITED STATES PATENTS

| | | | |
|---|---|---|---|
| 3,723,916 | 3/1973 | Speiser et al. | 310/9.8 X |
| 3,745,384 | 7/1973 | Blanchard | 310/8.2 |
| 3,766,496 | 10/1973 | Whitehouse | 310/9.8 X |
| 3,770,949 | 11/1973 | Whitehouse et al. | 310/9.8 X |
| 3,781,721 | 12/1973 | Judd et al. | 310/9.8 X |

Primary Examiner—J. D. Miller
Assistant Examiner—Mark O. Budd
Attorney, Agent, or Firm—Howard P. Terry

[57] ABSTRACT

Transducer devices employing relative changes in the acoustic propagation characteristics of Rayleigh waves flowing along polished surfaces of a thin elastic member yield a measure of the degree of flexing or surface strain of an elastic member. Stable signal processing and excitation circuits supply outputs proportional to strain, free of mode locking and other spurious interactions of the oscillatory circuits that include the surface wave delay elements.

14 Claims, 12 Drawing Figures

STABLE ACOUSTIC DELAY SURFACE WAVE MOTION TRANSDUCER SYSTEMS

BACKGROUND OF THE INVENTION

1. Field of the Invention

The invention pertains to sonic transducer devices employing surface acoustic waves and adapted for use in the measurement of strain, displacement, acceleration, force, or related parameters and more particularly relates to transducers utilizing relative changes of the velocity of propagation of acoustic surface waves and of the effective length of flexible elements constituted of materials, for example, of the piezoelectric or ferroelectric kinds.

2. Description of the Prior Art

Generally, prior art accelerometers and other displacement or strain measuring devices encompass a variety of structures and principles. Each approach has been found to have its particular merits, but many defects are also present, such as lack of sensitivity and reliability on the one hand, and fragility and high cost on the other. Many prior art arrangements are inherently analog in nature and do not lend themselves directly to use in digital processors. The prior art includes a variety of piezoresistor transducers, including direct stress transducers of the kind employing a flexible cantilever clamped at one end to which acceleration or physically applied forces are directed at the unclamped end for flexing the cantilever. In these transducers, the basic structural member (the cantilever) does not contribute greatly to the sensitivity of the apparatus, merely transmitting the stress to be measured to a more sensitive sensor element such as a piezoresistor affixed to the flexing surface of the cantilever. Measurement of electrical current flow through such resistors yields a measure of strain of the cantilever. Such devices are, however, expensive and difficult to manufacture and strict controls must be exercised in order that the product be uniform. Further, adhesives used to affix the resistors to the flexure member do not demonstrate great reliability. Since resistivity of an exposed resistor element is to be measured by measuring flow of electrical current through it, the devices are sensitive to changing ambient temperature and humidity. Strict maintenance of calibration requires many special precautions. Furthermore, the devices are inherently analog in nature and are best suited for application when the associated display or other utilization device is also an analog device. Such measurement devices generally demonstrate troublesome zero drift and scale factor drift with variations in temperature and in power supply voltage and may therefore demonstrate significant warm up drifts and continued instability after that initial period.

SUMMARY OF THE INVENTION

The present invention relates to strain, motion, force, or acceleration transducing devices employing surface propagating acoustic waves on flexible elements, such as waves of the Rayleigh type. Measurements are made of the relative changes in the time of propagation of the surface sonic wave as the flexible element is displaced by the forces to be measured. Devices of this general nature have been described by H. B. Matthews, H. van de Vaart, and J. C. Worley in the U.S. Pat. application Ser. No. 300,034 for "Acoustic Delay Surface Wave Motion Transducers," filed Oct. 24, 1972, and also by L. R. Schissler in the U.S. Pat. application Ser. No. 350,274 for "Acoustic Delay Surface Wave Motion Transducer Systems," filed Apr. 11, 1973, both applications being assigned to the Sperry Rand Corporation.

The present invention provides novel signal processing systems for improving the operation and precision of the transducers of U.S. Pat. applications Ser. Nos. 300,034 and 350,274 by making them more fully independent of spurious effects of undesired signal coupling between oscillatory channels of the transducer systems.

DESCRIPTION OF THE PREFERRED EMBODIMENTS

The transducer employed as the motion sensor in the present invention utilizes changes in the propagation characteristics of acoustic waves flowing at the opposed surfaces of a relatively thin elastic or flexure member to provide output signals then compared for yielding measures of the degree of flexure of the elastic member. Accordingly, the sensor may be used to detect relative motion between parts of the flexing elastic member, whether induced by direct acceleration of parts of the flexible member itself, or whether induced by a directly communicated mechanical force, as in conventional strain gauges or other such transducer devices.

Figure 1:
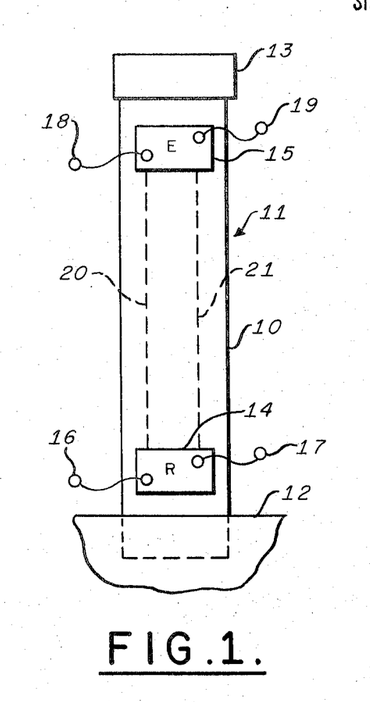
FIG. 1 is an elevation view of a preferred form of the transducer.
Figure 2:
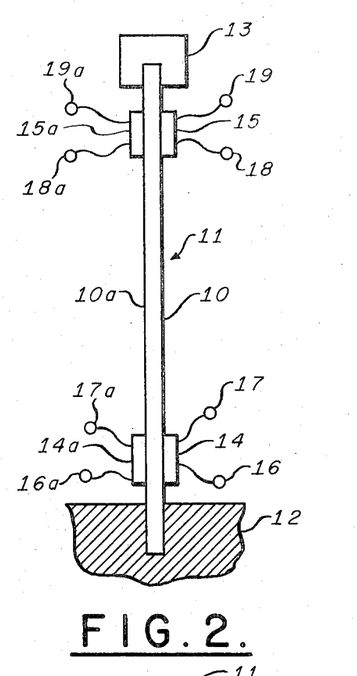
FIG. 2 is a side view of the transducer of FIG. 1.

As seen in FIGS. 1 and 2, the transducer employs the propagation of a surface elastic plane wave at a predetermined boundary surface 10 of a clamped elastic cantilever or flexure member 11. The cantilever flexure device 11 is clamped in a generally conventional manner within a base element 12. Cantilever 11 normally has a thin cross section of elongate or rectangular shape, thus affording a preferred flexure direction and also little sensitivity to forces applied at right angles to the thin dimension. Depending upon the selected design acceleration, when operated as an accelerometer, for instance, the cantilever may have a seismic mass 13 clamped at its end opposite base 12.

Waves of the Rayleigh type are useful in the device; with Rayleigh waves, the particle motion at the boundary surface 10 is miniscule and retrograde elliptical; i.e., components of particle displacement exist both in the direction of energy propagation and normal to the boundary surface plane. The desired surface acoustic wave velocity is slightly less than the bulk elastic wave velocity often employed in prior art elastic transducer devices. The acoustic energy of the preferred wave flows almost entirely within a thin layer at surface 10 and is closely bound to that surface, the propagation velocity being substantially independent of the carrier frequency of the wave.

The surface acoustic waves are accompanied by propagating synchronous alternating traveling electric and magnetic fields which extend somewhat into free space above the boundary surface 10. Quartz, piezoelectric semiconductors, and ferroelectric materials, as well as other materials, demonstrate such surface wave propagation. Excitation of the running surface acoustic wave is accomplished by generating a compatible running electric field wave at the surface boundary of the medium on which the surface waves are to propagate. Similarly, for magnetostrictive materials, the surface wave may be excited by presenting a time varying magnetic field at the boundary surface. Various methods of generation of such surface waves have been described in patents and the other literature. The same principles as are employed for exciting the waves may generally be used to convert the waves back into electrical signals.

In FIGS. 1 and 2, element 15 is an exciter for exciting acoustic surface waves flowing along the idealilzed path defined by dotted lines 20, 21 at the surface layer 10 of the transducer. An electrical driving signal applied to the flexible lead terminals 18, 19 is converted by exciter 15 into Rayleigh waves which may be collected by receiver element 14, wherein the acoustic signals are re-converted to electrical signals appearing at the flexible lead output terminals 16, 17. It will readily be seen by those skilled in the art that the functions of exciter 15 and receiver 14 may be interchanged as a matter of design choice.

If the top of cantilever flexure member 11 is moved to the left in FIG. 2, the distance between exciter 15 and receiver 14 is increased; therefore, an increased time is taken for the acoustic signal to flow between elements 14 and 15. Conversely, if the top of cantilever 11 of FIG. 2 is moved to the right, the surface 10 of the cantilever is compressed and the distance between exciter 15 and receiver 14 is diminished. Therefore, the acoustic signal would arrive at receiver 14 in a shorter time than in the previous situation. However, in some materials, propagation velocity may also change upon flexing, and delay may then actually increase or decrease with strain. In any event, an alternating motion of the seismic mass 13 produces a total signal delay at output terminals 16, 17 modulated in time in proportion to the vibration amplitude of the mass 13. It will be seen that a measure of the deflection of cantilever 11 may be made in several ways, as is taught in the aforementioned pending U.S. Pat. applications Ser. Nos. 300,034 and 350,274.

In the form of the transducer preferred for use in the present invention, an arrangement is used of cooperating systems inherently substantially immune to ambient temperature conditions when operated with appropriate signal processing circuits. Paired surface wave paths 10, 10a are now formed as seen in FIG. 2 on opposed sides of the flexure cantilever 11, path 10 being associated with exciter 15 and receiver 14 and path 10a with exciter 15a and receiver 14a. It will be understood that movement of mass 13 to the left causes path 10 to stretch, while path 10a is simultaneously compressed by a substantially equal amount, and vice versa. If the temperature of cantilever 11 changes, the respective at-rest distances or transmit times between elements 14, 15, and 14a, 15a change substantially equally. If a signal processing circuit is used in which the effective total delays are subtracted one from the other, the spurious delay changes induced by temperature changes are substantially cancelled.

Figures 3, 4:
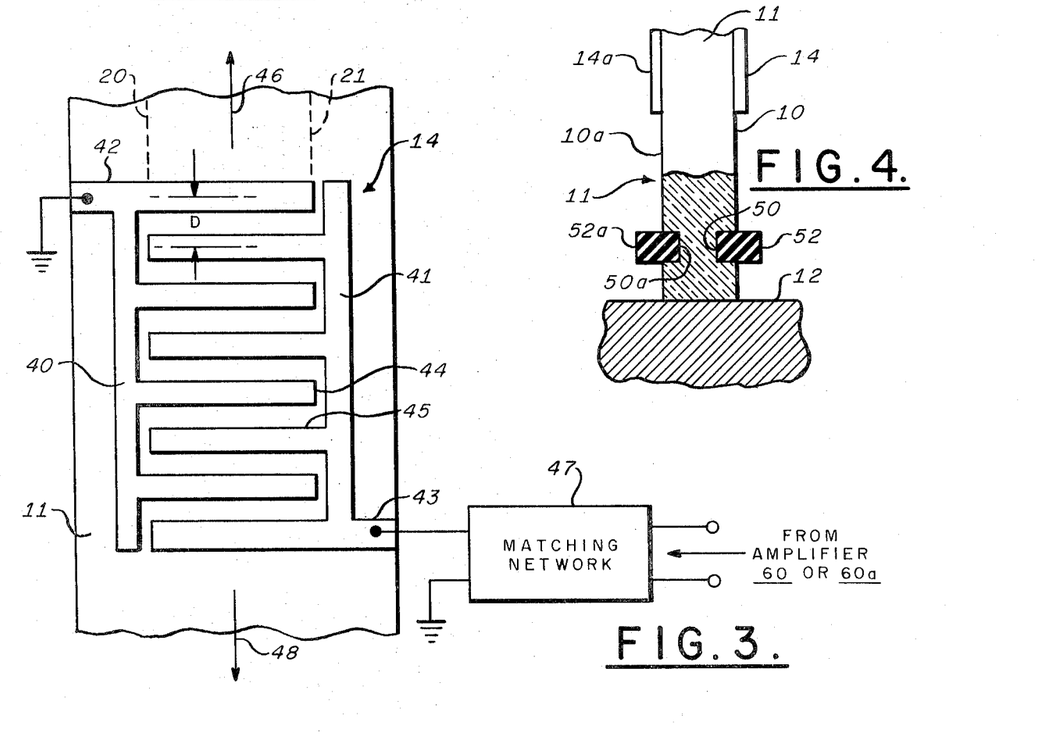
FIG. 3 is an elevation view of an acoustic driver or receiver device which may be used in transducers such as that of FIGS. 1 and 3.
FIG. 4 is a view, partly in cross section, of a detail of an absorber structure which may be used in the apparatus of FIGS. 1 and 2.

While several types of surface wave exciters and receivers are available in the prior art, one arrangement which may be used is illustrated in FIG. 3. By way of example, the exciter device of FIG. 3 consists of a pair of parallel electrodes 40 and 41 with respective parallel interdigital fingers of alternating instantaneous polarity, such as the respective fingers 44 and 45. Standard photoetching and photoresist masking or other known techniques may be used to fabricate the thin conductors of the interdigital electrodes 40 and 41, which electrodes may be made of aluminum or other electrically conducting material, and may have widths of the order of microns depending upon the design frequency. Adjacent fingers of any one electrode, such as fingers 44 of electrode 40, are spaced substantially one wave length apart at the operating carrier frequency. The electrode device 40, 41 acts in a manner analogous to an end fire radio antenna array, propagating the desired forward surface wave in the direction indicated by arrow 46 when driven by signals passed through a conventional matching network 47 from a suitable source of electrical current oscillations.

If the presence of a reverse wave as indicated by arrow 48 may not be tolerated, this wave energy may be absorbed in a convenient acoustically matched absorber. For example, an end layer of conventional acoustic absorbing material, such as wax or rubber or dielectric tape, may be used. Since the major portion of the acoustic energy at the surface wave is bound to a layer including the surface 10 and the substrate to a depth of about one wave length below surface 10, the surface wave may be absorbed as in FIG. 4 by milling or otherwise forming transverse slots 50, 50a in the respective opposite propagation surfaces 10, 10a between the exciters and the base 12, and by filling the slots with acoustic absorbers 52, 52a composed of wax, rubber, or other suitable material. Slots 50, 50a are grossly exaggerated in size in the figure merely for convenience in illustrating them.

An advantage of the construction is that the surface wave exciter when placed, for instance, at base 12, launches surface waves traveling only away from the clamped support region at base 12, and the nature of the clamped region has substantially no effect on wave propagation, substantially no echoes being produced. Since the law of reciprocity applies to the exciter 15 of FIG. 3, a similarly constructed electrode system may act as a receiver 14, coupling to the traveling electric field associated with the surface elastic wave, and thereby yielding a useful electrical output for signal processing. The interdigital electrodes in FIG. 3 may be connected to cooperating circuits by fine gold wires fastened by standard thermocompression techniques or the like to the electrodes at points 42, 43.

In operation, the exciter electrode system 15 of FIGS. 1 through 4 interacts with the quartz, lithium niobate, bismuth germanate, or lithium germanate substrate that forms the cantilever flexure element 11, producing the two oppositely running surface acoustic waves 46, 48 flowing at right angles with respect to the electrode fingers 44, 45. Adjacent fingers of electrodes 40, 41 are preferably spaced apart by an integral number of half wave lengths. The traveling wave is therefore successively amplified as it passes under each pair of adjacent electrode fingers. The receiver electrode system 14 is similarly constituted and readily operates in the reverse sense to reconvert the acoustic wave into a delayed electrical output signal at leads 16, 17. In both cases, it is preferred in the interest of efficiency to space the electrode fingers so that the condition of acoustic synchronism obtains. Then, the traveling electric field at the exciter, for example, has the same periodicity as the electric field normally bound to the acoustic wave. For this condition, the distance D in FIG. 3 is one half wave length.

The configurations of the transducers 14, 15 thus far discussed have in common the attribute that either the exciter or receiver element is located at the movable end of the flexible element 11, making necessary the use at that movable end of flexible leads such as the leads of terminals 18, 19 in FIGS. 1 and 2. It will be understood that the present invention may employ other of the forms of the transducers described in the previously mentioned U.S. Pat. application Ser. No. 300,034, such as those in which both the exciter and receiver electrode systems are located at the clamped end of the flexure member or cantilever 11. Thus, it is not necessary to have electrical connections at the free end of the cantilever flexure member 11 which might in some circumstances adversely affect operation of the invention. An acoustic reflector is placed adjacent the free end of the cantilever 11, the exciter and receiver elements 15 and 14 being disposed side-by-side near the base 12. The surface wave generated by exciter 15 is reflected back by the reflector into receiver 14.

Figure 5:
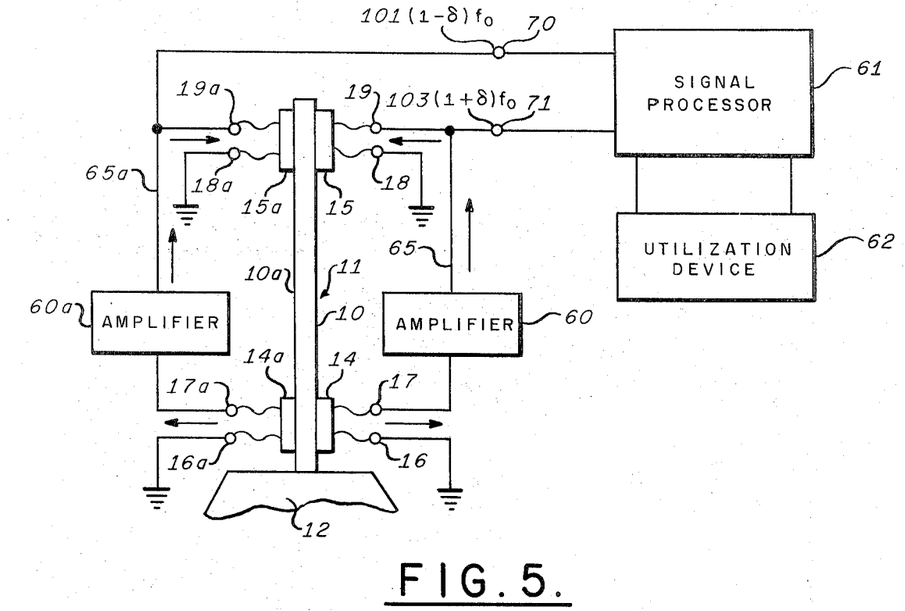
FIG. 5 is a circuit diagram of one form of signal processing and excitation circuit generally useful with embodiments of the invention such as that of FIGS. 1 and 2.

In describing the several embodiments of the present invention, it will be convenient first to discuss the structure and operation of the basic transducer and signal processor system illustrated in FIG. 5. In FIG. 5, a motion transducer system employing a flexure cantilever element 11 corresponding to that of FIGS. 1, 2, and 3 is illustrated. Feed back amplifier 60 supplies exciter 15 with a carrier signal via terminals 18, 19 for generating a surface wave along surface 10 then picked up by receiver 14, whose electrical output is coupled via terminals 16, 17 to an input of amplifier 60. The output of receiver 14 is seen to be coupled via feed back lead 65 in generally frequency determining relation to the input of amplifier 60 in a circuit having an inherent frequency of sine wave oscillation. Because of the feed back connection 65, the amplifier circuit will oscillate at a frequency such that the phase shift around the loop 14, 60, 15, 14, is an odd multiple of 180°. The amplifier has a gain with a negative sign; if its gain were positive, it would oscillate at even 180° phase shift intervals.

The cantilever flexure element 11 of FIG. 5 is further equipped, as in FIGS. 1 and 2, with an exciter 15a and receiver 14a associated with the second and independent surface wave path 10a. Amplifier 60a is used to drive exciter 15a. The carrier acoustic wave, in traversing the surface path 10a, has its phase varied upon arrival at receiver 14a if the flexure cantilever 11 is flexed. The frequency of oscillation will always adjust itself so that the original phase shift of 180° is restored. Accordingly, the signals appearing at terminals 70 and 71 in FIG. 5, have opposite senses of frequency modulation representing any flexure of cantilever 11. These oppositely modulated frequencies may be processed in signal processor 61 to develop therein an actual direct representation of the instantaneous flexure of cantilever 11 for application to utilization device 62, which may be a known type of display or meter whose deflection is proportional to the amplitude and sense of the acceleration.

For example, as described in detail in the pending U.S. Pat. application Ser. No. 350,274, whose specification is to be regarded as incorporated in total in the present specification, the frequency of the electrical signal generated by receiver 14 may be beat or heterodyned in a mixer within processor 61 with that from receiver 14a, to produce an output beat frequency signal. An appropriate filter may be used to pass the difference beat frequency, for example, readily excluding the sum frequency signal also present in the output of the mixer. The output of the filter may then be subjected to the action of a conventional frequency-to-unidirectional current converter. The amplitude of deflection of electrical meter or other display 62 is then proportional to the magnitude of the unidirectional current developed by the converter, accordingly being proportional to the magnitude of deflection of cantilever flexure member 11.

In the system of FIG. 5, each surface wave delay propagation surface element 10 and 10a is used as the primary determinant of the natural sine wave oscillation frequency of an associated oscillatory circuit including gain. The basic or at-rest system oscillation frequency $f_s$ is:

$$f_s = 1/2(T + t_o)$$

(1)

where T is the delay time of each of the surface delay elements 10 and 10a and $t_o$ is essentially the delay time through each of the amplifiers 60, 60a. This is the lowest frequency such that the phase delay through the line and amplifier is 180°. It will be understood that the loops can also readily be designed to oscillate at any odd multiple of frequency $f_s$. Thus, the oscillation frequency can be at any frequency $(2N + 1) f_s$, where N is an integer. This feature beneficially permits setting the design scale factor of the device at a high value and permits greater measurement resolution in a given counting time. In the preferred form of the invention, the delay inherent in amplifiers 60, 60a is made as small as possible, so that the operating frequency depends very little upon the nature of the amplifiers.

It is normally preferred that the two oscillatory circuits do not operate at the same frequency. When operated at substantially the same frequency, a condition presents itself which has previously been observed when two presumably independent oscillatory circuits operate at or near the same frequency when in relatively close proximity. There will generally be stray coupling between the otherwise independent oscillator circuits, such as stray capacitive or inductive coupling, or coupling through the finite impedance of a common power supply, or the like. In the flexure element 11, there is also the possibility of a small, but finite, undesired interaction of surface or other acoustic waves running at the otherwise independent surfaces 10, 10a. An important source of difficulty may be undesired capacitive coupling of electrodes such as electrodes 15, 15a on opposite sides of the dielectric flexure element 11.

The undesired effects of mode locking between otherwise independent oscillators have been discussed extensively in the literature in technical papers of general scope and particularly in patents and the other literature dealing with the ring laser sensor. For present purposes, it will therefore suffice to observe that the aforementioned types of coupling in the FIG. 5 apparatus will cause the two oscillators, as their operating frequencies approach one another, to mode lock when an arbitrarily small frequency difference is reached. The oscillators continue in the mode locked state over a band of strains from zero back to the arbitrary value at which mode locking was initiated. There will therefore be a region in which the deflection of meter 62 is usefully proportional to acceleration; but, in a small, but finite region near zero acceleration, the proportionality disappears and only the qualitative information is conveyed that the actual acceleration lies somewhere near zero. As described in the aforementioned U.S. Pat. application Ser. No. 350,274, the mode locking tendency may be overcome if the oscillatory circuits are caused to run at two different odd multiples of the frequency $f_s$.

The oscillatory circuits activated by the respective amplifiers 60, 60a of FIG. 5 are then adjusted under operating conditions to run at two different frequencies that are multiples of $f_s$, a frequency which varies as the sensor is accelerated. For example, assume that the oscillator associated with amplifier 60 operates in use at the frequency $(2N - 1) f_s$ and that using amplifier 60a operates in use at frequency $(2N + 1) f_s$. If the integer N is 51, for example, then the operating frequencies with no strain are $101 f_s$ and $103 f_s$. The numbers 101 and 103 are each prime numbers, as well as being relatively prime, and many such prime number pairs exist that are separated by two. Under these conditions, the interaction between the two oscillators averages to zero over many cycles, and no mode locking takes place. It will be understood that a frequency separation of $2 f_s$ is sufficient always to prevent mode locking. The two frequencies of any such frequency pair evidently can still be referred to the same scale in the signal processor system 61 by frequency multiplication and division as is accomplished in the aforementioned U.S. Pat. application Ser. No. 350,274. The separation of the frequencies of oscillation of the two oscillatory circuits is thus an even multiple of $f_s$ at zero strain; it must be larger than the data-bearing frequency shifts due to the strain or acceleration to be measured. In practice, the data-bearing shifts are quite small in comparison, for example, to $2 i f_s$.

Figure 6:
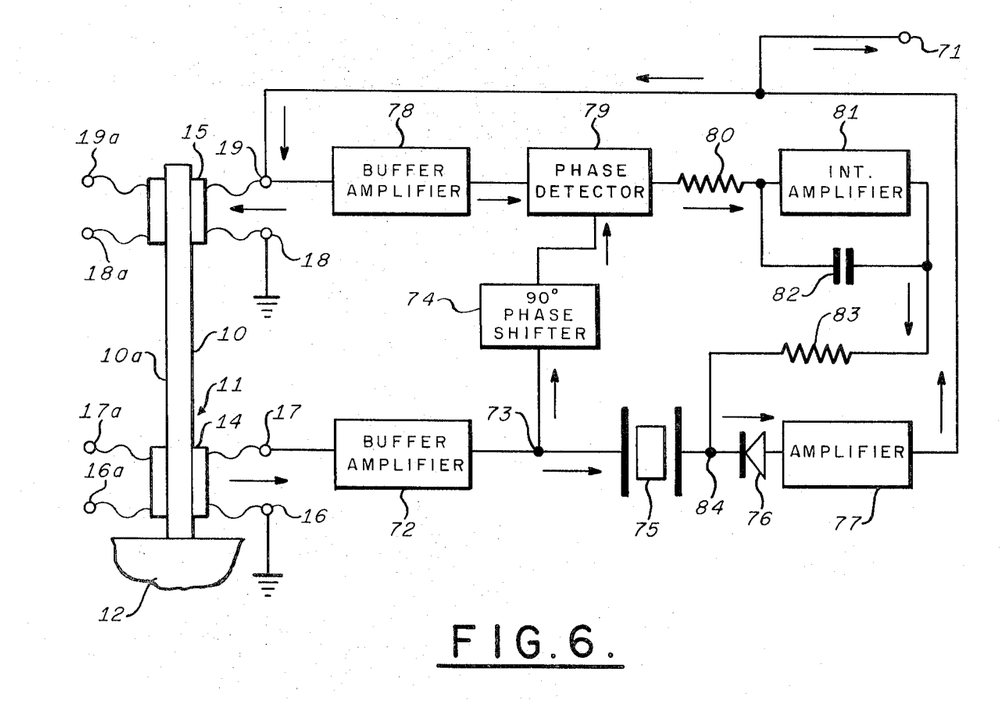
FIGS. 6, 7, and 8 are circuits alternative to that of FIG. 5.

A system employing these principles is illustrated in FIG. 6 and in U.S. Pat. application Ser. No. 350,274, where the output of the $(2N - 1) f_s$ oscillator appears at terminal 70 and the output of the $(2N + 1) f_s$ oscillator appears at terminal 71, terminals 70 and 71 being respectively coupled to the outputs of amplifiers 60a and 60. For ease in illustrating an example, assume that the surface path 10 has been lengthened by a fractional value δ, so that its associated oscillator runs at frequency $(2N - 1) (1 - \delta) f_s$ or $101 (1 - \delta) f_s$. For the same reason, assume that surface path 10a has been lengthened by the same fractional value δ, so that its associated oscillator runs at frequency $(2N - 1) (1 + \delta) f_s$ or $103 (1 + \delta) f_s$. These frequencies are indicated in FIG. 5 at terminals 70, 71 and are manipulated by signal processor 61 by frequency translation, as aforementioned, to produce the desired input to utilization device 62. As further taught in the pending application Ser. No. 350,274, mode locking may also be avoided by separating the data-bearing signals in the time domain, as well as by separating them in the frequency domain as in FIG. 5.

The objective of the present invention is to control precisely the oscillation frequencies of cooperating oscillatory circuits such as those associated with amplifiers 60, 60a of FIG. 5 without the use of narrow band circuits such as conventional fixed frequency filters. Such filters will introduce temperature sensitive delays of their own and have characteristic finite phase versus frequency slopes. Slight drifts in the filter center frequencies would result in frequency shifts in the associated oscillatory circuits which cannot be distinguished in signal processor 61 from the frequency changes due to strain of the cantilever 11. While fixed filters for the two oscillators may be very carefully selected so that they will approximately track, they would be tuned to somewhat different frequencies and therefore would not be identical and could not track perfectly. So as to avoid the use of such fixed filters and for the purpose of providing substantial isolation between the oscillating circuits providing useful outputs at terminals 70 and 71 of FIG. 5, the exitation arrangement shown in FIG. 6 is employed. Only the stable excitation system coupled to receiver terminals 16, 17 and to exciter terminals 18, 19 and providing a useful control signal on terminal 71 will be discussed. It will be understood by those skilled in the art that a similar circuit operating at the aforementioned slightly different frequency cooperates with receiver terminals 16a, 17a and with exciter terminals 18a, 19a to provide a second closely regulated output on terminal 70 of FIG. 5.

Referring particularly to FIG. 6, it is seen that the novel acceleration measurement circuit includes a buffer amplifier 72 coupled to receiver terminal 17, whose output is supplied to branching circuits at junction 73. A first branching circuit supplies the 90° phase shifter 74, whose purpose remains to be discussed, while a second branching circuit feeds an oscillatory signal to the conventional quartz crystal 75. Quartz crystal 75 is further connected in series with a varactor diode 76 and a primary amplifier 77, which latter amplifier is the primary source of energy for driving exciter 15 of cantilever 11. The output of amplifier 77 is also used to supply terminal 71 of FIG. 5 with the signal $103 (1 + \delta) f_o$, for example, as well as supplying the driving voltage to terminal 19 of exciter 15.

Also coupled to the exciter terminal 19 is a buffer amplifier 78 further connected in series relation to phase detector 79, resistor 80, and operational amplifier 81. The second input of phase detector 79 is supplied by the output of 90° phase shifter 74. Amplifier 81 may be a conventional operational amplifier employed in the usual manner, serving as an integrator with the resistor 80 in its input and a resistor 83 in its output, resistor 83 being connected to a junction 84 lying between the quartz crystal 75 and varactor diode 76. In this circuit, it is seen quartz crystal 75 and the varactor diode 76 act as a series-tuned voltage controlled filter under the control of the output of operational amplifier 81.

The filter circuit comprising elements 75 and 76 is continuously retuned by the output of amplifier 81 to follow the changing frequency caused by stresses in the surface 10 of cantilever 11 when it experiences acceleration. The phase difference detected by phase detector 79 causes crystal 75 to be continuously retuned in a closed loop manner, so that the output of phase detector 79 is held substantially at the zero level. It is seen that the output of phase detector 79 is zero when its two inputs are in substantial quadrature. For this reason, the 90° phase shifter 74 ensures that the outputs of the buffer amplifiers 72 and 78 are held substantially in phase. As the frequency of the oscillatory loop changes due to strains induced in cantilever 11, the phase shift of filter 75, 76 and of the primary amplifier 81 is continuously tuned to zero. Drifts in these components are also rendered harmless. The buffer amplifiers 72 and 78, the 90° phase shifter 74, and the phase detector 79 are outside of the automatic correction loop, but these four components may be made broad band so that they introduce only negligible delays. Thus, the novel circuit of FIG. 6 corrects for thermal and other phase shifts and drifts, effectively to maintain a zero differential phase shift while allowing for frequency selectivity. It will be apparent to those skilled in the art that other types of voltage or current controlled filters may be substituted for filter elements 75, 76 with good effect. The similar circuit supplying the useful output at the terminal 70 of FIG. 5 is substantially a duplicate of the circuit of FIG. 6, but is arranged to operate at the aforementioned slightly different frequency 101 $(1 - \delta) f_o$.

Figure 7:
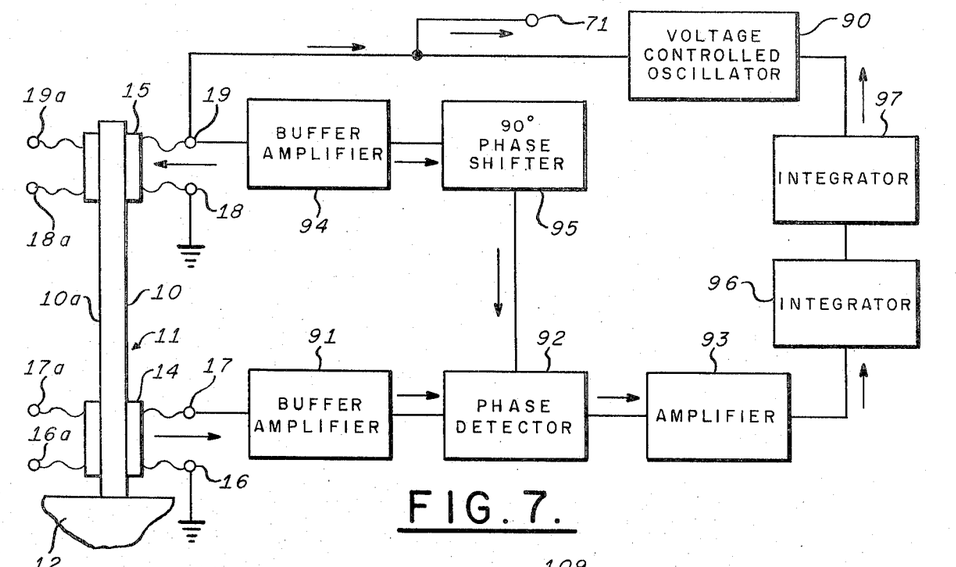

FIG. 7 illustrates a further embodiment of the invention in which a voltage controlled oscillator 90 is employed for providing the results achieved in FIG. 6 by the voltage controlled filter 75, 76. In FIG. 7, terminal 17 of the receiver 14 is coupled to a buffer amplifier 91 whose output is series connected with a phase detector 92, an amplifier 93, and the voltage controlled oscillator 90. The output of voltage controlled oscillator 90 is supplied directly to terminal 19 of the exciter 15 and is also coupled as a useful output to terminal 71 as in FIG. 5. Terminal 19 of the FIG. 7 structure is also coupled to a buffer amplifier 94 which supplies a second input to the phase detector 92 through 90° phase shifter 95. Before being supplied to the voltage controlled oscillator 90, the output of amplifier 93 may be subjected to one or to two successive integrations in integrators 96 and 97, required since a change in frequency of the oscillatory loop leads only to a measure of a change in phase at the output of phase detector 92. A similar arrangement is again used to supply the useful output destined for terminal 70 of FIG. 5. The system of FIG. 7 has several advantages. For example, only the signal path between buffer amplifiers 94 and 91 and phase detector 92 is important for achieving good phase stability. Furthermore, suitable voltage controlled crystal oscillators are readily available on the market. If the input impedance of phase detector 92 is stable, it will be possible in some applications to omit buffer amplifiers 91 and 94. The oscillation frequency is then controlled substantially only by the length of the surface wave path 10, the leads to phase detector 92, and the phase detector itself.

Figure 8:
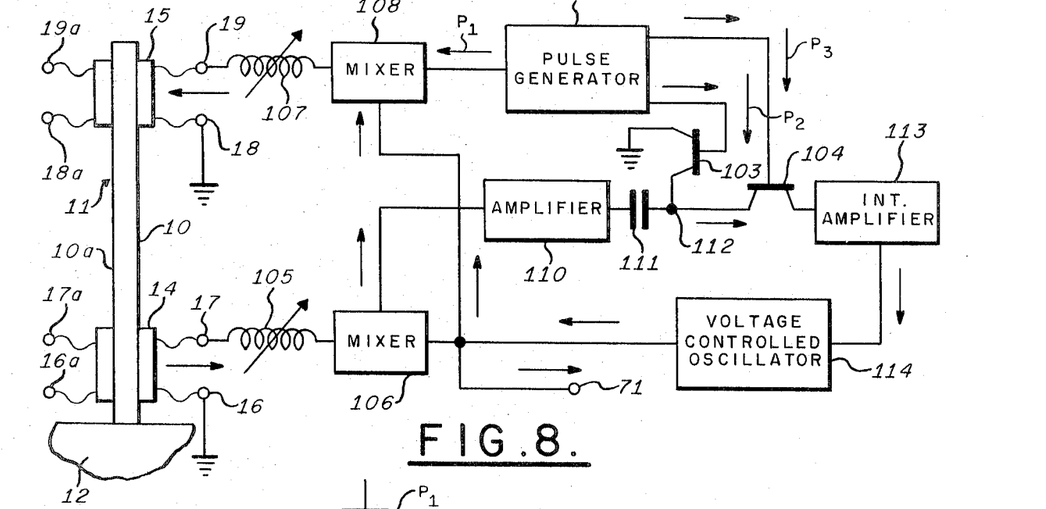

In some applications of the apparatus described in the foregoing, a problem arises requiring compensation. This problem is connected with the possible presence of undesired signal leakage or feed-through signals. For example, in FIG. 7, when the oscillatory circuit drives the exciter 15, some of the radio frequency power employed may, under some circumstances, be coupled directly to the receiver transducer 14 through a free space path because of stray capacitance or inductance effects, without passing along the delay surface 10 from exciter 15. It will be appreciated that this undesired leakage is not shifted in phase even when the cantilever flexure device 11 is strained. The presence of the leakage signal can lead to large measurement errors in processor 61. The device of FIG. 8 affords a remedy to this problem without the use of complex shielding proximate the transducers 14 and 15. The operation of the apparatus of FIG. 8 is by gating bursts of radio frequency energy into the surface wave device 10 and by gating out only the properly delayed signal for use in the oscillatory loop, rejecting the undelayed leakage signals by time separation methods.

Figure 9:
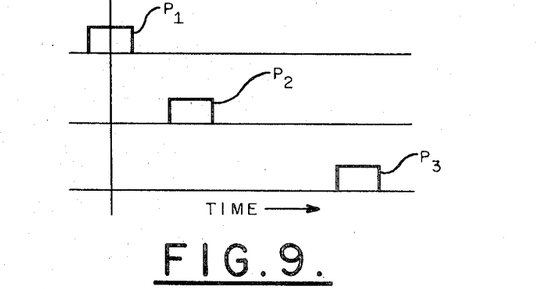
FIG. 9 is a graph of signal wave forms useful in explaining operation of the invention.

A system for providing the desired elimination of stray signals is illustrated in FIG. 9, wherein the output terminal 17 of receiver 14 is coupled through a tuning inductor 105 as one input of double balanced mixer 106, which mixer 106 receives a second input, as will be discussed. The terminal 19 of exciter 15 receives its excitation through a tunable inductor 107 supplied from the output of mixer 108. Inductors 105, 108 are analogous to matching network 47 of FIG. 3. The second input to mixer 106 is also supplied as a second input to double balanced mixer 108, which serves as a switch or gate. A pulse generator 109 generating the square wave $P_1$ shown in FIG. 9 supplies the train of pulses $P_1$ to the second input of switching mixer 108. Pulse generator 109 is a conventional arrangement employing conventional means such as tapped delay lines, or multivibrator circuits for generating the successive square pulses $P_1$, $P_2$, $P_3$, of FIG. 9 each of about 2 microseconds duration.

The trains of pulses $P_2$ and $P_3$ are used in a control circuit receiving the output of mixer 106, which acts like a phase detector. This output is coupled to amplifier 110, and the output of amplifier 110 is coupled through capacitor 111 to a transistor 104 whose base electrode is supplied with the train of pulses $P_3$ from generator 109. Coupled to a terminal 112 lying between capacitor 111 and transistor 104 is a second transistor 103 supplying a path to ground for the circuit under control of the train of pulses $P_2$ from generator 109. The output of transistor 104 gates integrating amplifier 113 whose output, in turn, controls the frequency of oscillation of voltage controlled oscillator 114. The output of the latter oscillator is fed to the aforementioned mixers 106 and 108 and also appears as the useful output at terminal 71. Amplifier 113 may include one or two integration stages, as desired.

In operation, the pulse $P_1$ from pulse generator 109 serves to gate a pulse of radio frequency energy from voltage controlled oscillator 114 into exciter 15 and thus into the wave propagating surface 10. Both the undesired fed-through pulses and the desired delayed pulse are collected by receiver 14 and are phase detected in double balanced mixer 106. Amplifier 110, which is a.c. coupled, amplifies the detected pulses in the output of mixer 106. The output is referred to zero level at the time of pulse $P_2$ when there is no output sensed by receiver 14, there being present neither a desired nor an undesired fed-through signal, thus avoiding the effect of drift in mixer 106 or in amplifier 110. The pulse $P_3$ gates the output of balanced mixer 106 at the time of arrival of the desired delayed radio frequency oscillations at amplifier 110 and its associated circuit for controlling the voltage controlled amplifier 114 so that the phases of the two signals input to mixer 106 are substantially in quadrature. In this system, only the tuning inductors 105, 107 and the delay surface 10 of the acceleration sensor affect the oscillation frequency. Thus, pulse $P_1$ causes excitation of the acoustic exciter 15 for propagating the desired wave on surface 10 and also the undesired wave, which latter arrives earliest at receiver 14. When the undesired signal coupled to receiver 14 reaches junction 112, it is automatically dumped to ground by the action of pulse $P_2$ on transistor 103. Upon the later arrival of the desired pulse at junction 112, it finds that there is no longer a path through transistor 103 to ground, but it is coupled instead by the action of pulse $P_3$ on transistor 104 to adjust the output frequency of the continuously operating voltage controlled oscillator 114.

Figure 10:
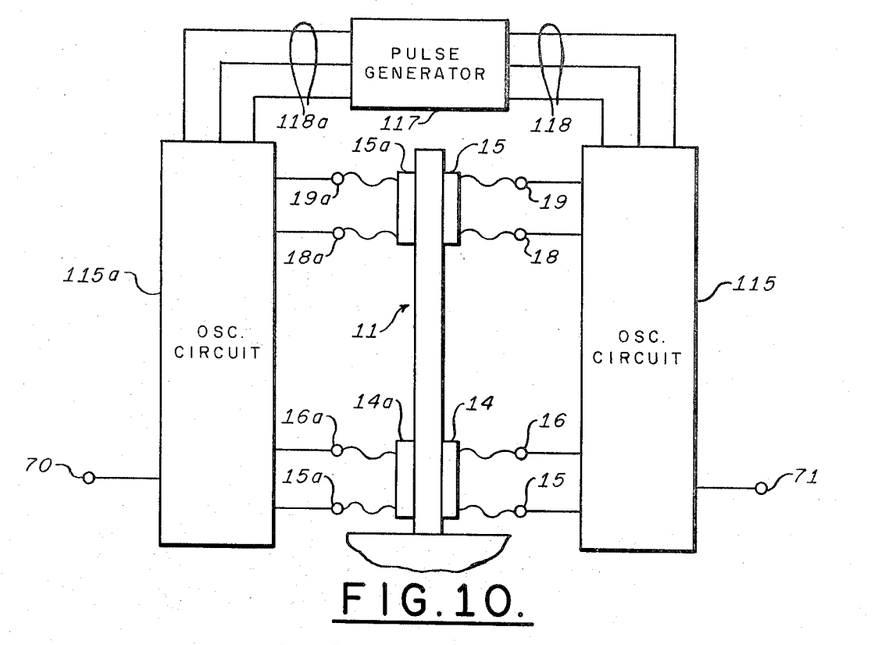
FIG. 10 is a further embodiment alternative to those of FIGS. 6, 7, and 8.
Figure 11:
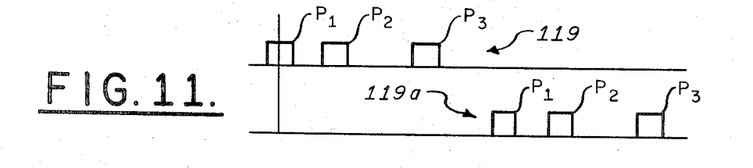
FIG. 11 is a graph of signal wave forms useful in explaining operation of the invention.

It will be understood by those skilled in the art that a second oscillatory system like that coupled to leads 16, 17, 18, 19 and to wave propagation surface 10 may be coupled to leads 16a, 17a, 18a, 19a to serve the wave propagation surface 10a. The wave propagating surfaces 10, 10a on the opposite sides of cantilever 11 may be gated in repetitive but separated time intervals as, for instance, is illustrated in FIGS. 10 and 11, so as further to reduce the possibility of undesired interactions. For example, an oscillatory circuit 115 like that of FIG. 10 may be gated by the gating pulse train 119 of FIG. 11, while the second oscillatory circuit 115a like that of FIG. 10 is gated by the gating pulses 119a, wave trains 119 and 119a being similar but separated so as to fall in distinct time intervals. Pulse generator 117 may be constructed similarly to pulse generator 109 of FIG. 8 for producing pulse train 119 on leads 118 and pulse train 119a on leads 118a.

Figure 12:
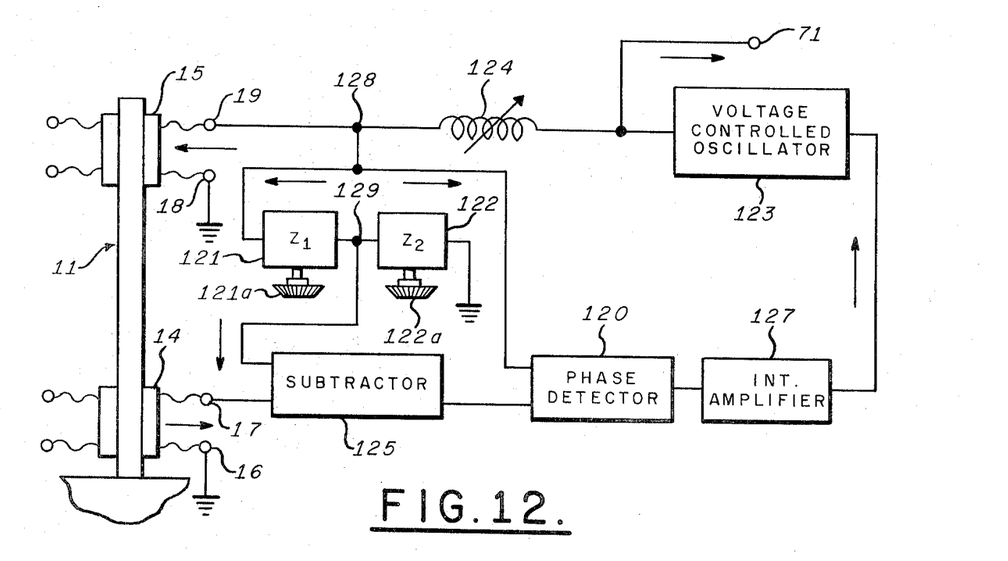
FIG. 12 is an additional form of the embodiments of FIGS. 6, 7, 8, and 10.

A further embodiment of the invention is disclosed in FIG. 12 in a form beneficially permitting the use of a high impedance phase detector 120; the use of high impedance input circuits eliminates the need for the output tuning inductor 105 of FIG. 8. Additionally, any undesired direct or free space coupling between transducers 15 and 14 is further reduced by using the bridge or signal divider circuit comprising impedance elements 121 and 122.

The FIG. 12 structure again utilizes a voltage controlled oscillator 123 whose output is supplied to the useful output terminal 71 of FIG. 5 and is also coupled through the tunable inductor 124 to terminal 19 of the exciter 15. The receiver 14 is coupled at terminal 16 to a subtraction circuit 125 and the output of subtraction circuit 125 forms one input to phase detector 120. As in the system of FIG. 7, the output of phase detector 120 is amplified by an integrating amplifier 127, which may supply one or more stages of integration, and is supplied to control the operational frequency of voltage controlled oscillator 123.

A second input to subtractor 125 is derived from junction 128 placed between terminal 19 and tuning inductor 124. The signal at junction 128 is supplied to ground through the series circuit made up of the bridge impedances 121 and 122. Junction 129 between impedances 121 and 122 is coupled as a second input to subtractor 125. The voltage at junction 128 is used for even an additional purpose, being supplied as a second input to phase detector 120. Thus, the phase detector 120 makes its phase comparison after the signal has passed through input tuning inductor 124, and no output tuning inductor is required. The effect of the bridge circuit consisting of impedances 121 and 122 is to reduce the undesired stray signal by simple means, eliminating the need for gating the various signals as practiced in FIGS. 8 and 10. Phase detector 120 has an input that is a fraction of the signal input at junction 128 formed by the dividing action of impedances 121 and 122 is subtracted from the output at terminal 16 of receiver 14. The values of impedances 121 and 122 are adjusted by adjustments 121a and 122a so that the undesired leakage signal is substantially cancelled. Again, the oscillation frequency depends mainly upon the length of the surface wave propagation path 10.

It will be understood by those skilled in the art that the invention may be employed as an accelerometer for operating displays or for providing velocity or acceleration-proportional electrical signals to other utilization equipment, such as to integrators for producing position or velocity data. While the seismic mass 13 in FIGS. 1 and 2 is shown as a seismic mass for use with the device as an accelerometer, the device may also be used to derive an electrical control signal proportional to the amplitude of any parameter susceptible of being converted into lineal motion or force, such as the deflection of a pressure diaphragm which may be converted into translation of the end of cantilever 11. The invention may be used with flexible elements other than cantilever flexure elements clamped at one end, such as on the active surface of a flexible diaphragm clamped at its peripheral edge in a pressure cavity or vessel for measurement of a varying pressure therein.

It will be understood by those skilled in the art that the physical geometries and dimensions suggested by the several figures are generally representative, but that the figures are proportioned for the purpose of clearly illustrating the principles of the invention in its various embodiments, and do not in themselves necessarily represent proportions or dimensions which would be used in actual practice.

It is seen that the invention is a stable sonic transducer excitation device and signal processing system employing surface acoustic waves that is adapted to use in the measurement of acceleration, force, strain, or related parameters. Relative changes in propagation velocity of Rayleigh waves flowing at paired flexure surfaces may be measured in an arrangement which is compact, light, accurate, and reliable. Inherently, the novel transducer in its several embodiments is highly sensitive, though substantially relatively immune to ambient conditions. The transducers have little zero drift or scale factor drift, or sensitivity to temperature, humidity, or power supply variations. In the several embodiments of the invention comparing times of transit along paired paths, maximum freedom from prior art defects is offered, as well as freedom from mode locking and other spurious coupling effects found disadvantageous in certain applications of prior art apparatus.

The novel transducers may be used to measure acceleration or as strain or displacement gauges and, since they provide a frequency or digital output, they avoid noise and drift problems inherent in purely analog devices and are easily interfaced with digital signal processors.

While the invention has been described in its preferred embodiments, it is to be understood that the words which have been used are words of description rather than of limitation and that changes may be made within the purview of the appended claims without departing from the true scope and spirit of the invention in its broader aspects.

I claim:

1. Transducer means comprising;

flexure means having first and second opposed flexible surface layer means for separately propagating respective first and second acoustic waves along first and second respective predetermined paths therein, first and second exciter means for exciting and propagating said respective first and second acoustic waves along said first and second respective predetermined paths in response to respective first and second exciter electric signals, first and second receiver means along said respective first and second predetermined paths for receiving and converting said respective first and second acoustic waves into respective first and second receiver electric signals, first and second respective driver circuit means for coupling said first receiver means to said first exciter means and for coupling said second receiver means to said second exciter means for forming, with said respective first and second opposed flexible surface layer means, first and second oscillatory driver circuit means oscillating at different respective first and second frequencies, at least said first oscillatory driver circuit means including:

phase detector means responsive jointly to the phases of said first respective exciter and receiver electric signals, and tunable oscillation frequency dtermining means responsive to said phase detector means, and signal processor means jointly responsive to said first and second oscillatory driver circuit means for deriving a measure of the flexure of said flexure means from said first and second frequencies for supply to utilization means.

2. Apparatus as described in claim 1 wherein said tunable oscillation frequency determining means includes voltage controlled oscillator means responsive to said phase detector means.

3. Apparatus as described in claim 2 additionally including integrator means interposed in series relation between said phase detector means and said voltage controlled oscillator means.

4. Apparatus as described in claim 2 additionally including phase shifter means for imposing a relative 90° phase shift on said first exciter electric signal before application to said phase detector means.

5. Apparatus as described in claim 2 additionally including signal amplitude subtractor means having output means coupled to first input means of said phase detector means and having first and second input means, said first input means of said amplitude subtractor means being supplied with said receiver electric signal.

6. Apparatus as described in claim 5 additionally including signal amplitude divider means for coupling to said second input means of said signal subtractor means a version of said exciter electric signal.

7. Apparatus as described in claim 1 wherein said tunable oscillation frequency determining means includes voltage controlled filter means responsive to said phase detector means.

8. Apparatus as described in claim 7 additionally including phase shifter means for imposing a relative 90° phase shift on said first receiver electric signal before application to said phase detector means.

9. Apparatus as described in claim 1 wherein said second oscillatory driver circuit means includes:

second phase detector means responsive jointly to the phases of said second respective exciter and receiver electric signals, and second tunable oscillation frequency determining means responsive to said second phase detector means.

10. Apparatus as described in claim 9 wherein said first and second opposed flexible surface layer means are oriented with respect to the predetermined flexure direction of said flexure means so as to be stressed in opposite senses for a predetermined flexure of said flexure means.

11. Transducer means comprising:

flexure means having first and second opposed flexible surface layer means for separately propagating respective first and second acoustic waves along first and second respective predetermined paths therein, first and second exciter means for exciting and propagating said respective first and second acoustic waves along said respective first and second predetermined paths in response to respective first and second exciter electric signals, first and second receiver means along said respective first and second predetermined paths for receiving and converting said respective first and second acoustic waves into respective first and second receiver electric signals, first and second respective driver circuit means for coupling said first receiver means to said first exciter means and said second receiver means to said second exciter means for forming, with said respective first and second opposed flexible surface layer means, first and second oscillatory driver circuit means oscillating at different respective first and second frequencies, at least said first oscillatory driver circuit means including:

first mixer means responsive to said first receiver means and to voltage controlled oscillator means for controlling the frequency of said voltage controlled oscillator means, second mixer means responsive to said voltage controlled oscillator means for supplying said first exciter electric signal to said first exciter means, and pulse generator means for supplying an output from said second mixer means in a first discrete time interval and for enabling said first mixer means to control the frequency of said voltage controlled oscillator means in a second discrete time interval, and signal processor means jointly responsive to said first and second oscillatory driver circuit means for deriving a measure of the flexure of said flexure means from said first and second frequencies for supply to utilization means.

12. Apparatus as described in claim 11 wherein said pulse generator means additionally prevents any output from said first mixer means occurring in a third discrete time interval between said first and second discrete time intervals from controlling said voltage controlled oscillator means.

13. Apparatus as described in claim 12 additionally including integrator means interposed in series relation between said first mixer means and said voltage controlled oscillator means.

14. Apparatus as described in claim 12 wherein said first and second opposed flexible surface layer means are oriented with respect to the predetermined flexure direction of said flexure means so as to be stressed in opposite senses for a predetermined flexure of said flexure means.

* * * * *